United States Patent
Nemeth (10) Patent No.: US 11,372,602 B1
(45) Date of Patent: *Jun. 28, 2022

(54) PRINT JOB ANALYSIS

(71) Applicant: Rose Nemeth, Boulder, CO (US)

(72) Inventor: Rose Nemeth, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/219,969

(22) Filed: Apr. 1, 2021

(51) Int. Cl.
*G06K 15/02* (2006.01)
*G06F 3/12* (2006.01)

(52) U.S. Cl.
CPC .......... *G06F 3/1208* (2013.01); *G06F 3/1234* (2013.01); *G06K 15/1822* (2013.01); *G06K 15/1836* (2013.01)

(58) Field of Classification Search
None
See application file for complete search history.

(56) References Cited

U.S. PATENT DOCUMENTS

| | | | |
|---|---|---|---|
| 5,581,752 A * | 12/1996 | Inoue | G06F 16/40 715/209 |
| 5,751,434 A * | 5/1998 | Narendranath | H04N 1/4072 347/131 |
| 8,233,176 B2 | 7/2012 | Sasaki | |
| 8,817,292 B1 * | 8/2014 | Rodriguez | G06F 3/1256 358/1.14 |
| 8,928,920 B2 | 1/2015 | Bell et al. | |
| 9,917,977 B1 * | 3/2018 | Basu | G06F 3/1245 |
| 10,331,861 B2 | 6/2019 | Condon et al. | |
| 2002/0008880 A1 * | 1/2002 | Dewitte | H04N 1/6011 358/1.9 |
| 2006/0209334 A1 | 9/2006 | Lawrence et al. | |
| 2009/0046306 A1 | 2/2009 | Green | |
| 2010/0328716 A1 * | 12/2010 | Mori | G06F 3/1208 358/1.15 |

(Continued)

FOREIGN PATENT DOCUMENTS

| | | | | |
|---|---|---|---|---|
| CN | 107066213 A | | 8/2017 | |
| JP | 2000196874 | * | 7/2000 | ............. G06F 13/00 |
| JP | 2009032075 A | | 2/2009 | |

OTHER PUBLICATIONS ip.com; Prior Art Database Technical Disclosure; Electronic Publication Date: Sep. 24, 2013.

*Primary Examiner* — Beniyam Menberu
(74) *Attorney, Agent, or Firm* — Duft & Bornsen, PC (57) ABSTRACT

Print jobs may include errors, which may be difficult to resolve. In the embodiments described herein, data objects in print jobs are converted into printable features that show the underlying information in the print job, which allows for a visual inspection of the logical structures and relationships between the logical structures and print data objects in a printed output. One embodiment comprises a print controller that stores a first print job comprising one or more data objects, and print job commands that define the data objects for the first print job. The print controller processes the print job commands to identify the data objects for the first print job, and outlines and presentation positions specified for the data objects, and generates a second print job that graphically represents the outlines and the presentation positions of the data objects as graphical shapes, and provides the second print job.

20 Claims, 8 Drawing Sheets

(56) References Cited

U.S. PATENT DOCUMENTS

| | | | |
|---|---|---|---|
| 2011/0167081 A1* | 7/2011 | Kosaka | G09G 5/00 |
| | | | 707/769 |
| 2017/0208181 A1* | 7/2017 | Kim | H04N 1/0023 |
| 2017/0220302 A1* | 8/2017 | Nakane | G06K 15/18 |
| 2021/0229465 A1* | 7/2021 | Miyajima | B41J 3/4075 |

* cited by examiner

PRINT JOB ANALYSIS

FIELD

This disclosure relates to the field of printing systems, and in particular, to analyzing print jobs.

BACKGROUND

Print shop operators may encounter problems when printing a print job for a customer. A result of this is that the printed output of the print job may not match the expected output of the customer and/or the print shop operator. Due to the complex nature of print jobs, these types of errors can be difficult to diagnose. The errors may be caused by underlying issues in the print job, which may not be readily apparent when viewing a printed output of the print job. For example, a customer generating a print job may intend to print data in one format, while accidently specifying in the print job to print the data in another format. Determining the type of error in the print job may not be readily apparent by looking at the printed output of the print job.

Thus, it is apparent that improvements may be made that allow for an analysis of print jobs in order to mitigate the printing errors that may arise in the print shop.

SUMMARY

In a print shop, print jobs may be received that include errors, which may be difficult to solve without additional tools. Often a printed output of the print job fails to visibly display what underlying issues in the print job may be causing issues, which leaves a print operator with few clues as to how to resolve the issues in the print job. Print jobs often include multiple types of logical structures and print data objects, along with commands that define the logical structures in the print job, define the print data objects for the print job, and define different printing states that a printer uses to generate a printed output. In the embodiments described herein, data objects in print jobs are converted into printable features that expose the underlying information in the print job, which allows for a visual inspection of the logical structures and relationships between the logical structures and the print data objects in the printed output. Because the conversion exposes the underlying information present in the print job, which is often invisible in a normal printed output of the print job, a technical benefit is achieved that allows for a visual inspection of the logical structures, print data object information, and a spatial relationship between the logical structures and print data object information that may be used during analysis in order to identify possible errors in the print job.

One embodiment comprises a print controller that stores a first print job comprising one or more data objects and print job commands that define the data objects for the first print job. The print controller processes the print job commands to identify the data objects for the first print job, and identifies outlines and presentation positions specified for the data objects. The print controller generates a second print job that graphically represents the outlines and the presentation positions of the data objects as graphical shapes, and provides the second print job.

Another embodiment comprises a method of converting a print job for analysis. The method comprises storing a first print job comprising one or more data objects and print job commands that define the data objects for the first print job, processing the print job commands to identify the data objects for the first print job, and identifying outlines and presentation positions specified for the data objects. The method further comprises generating a second print job that graphically represents the outlines and the presentation positions of the data objects as graphical shapes, and providing the second print job.

Another embodiment comprises a non-transitory computer-readable medium embodying programmed instructions which, when executed by at least one processor of a print controller, directs the at least one processor to store a first print job comprising one or more data objects and print job commands that define the data objects for the first print job, process the print job commands to identify the data objects for the first print job, and identify outlines and presentation positions specified for the data objects in the first print job. The programmed instructions further direct the at least one processor to generate a second print job that graphically represents the outlines and the presentation positions of the data objects as graphical shapes, and provide the second print job.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 1:
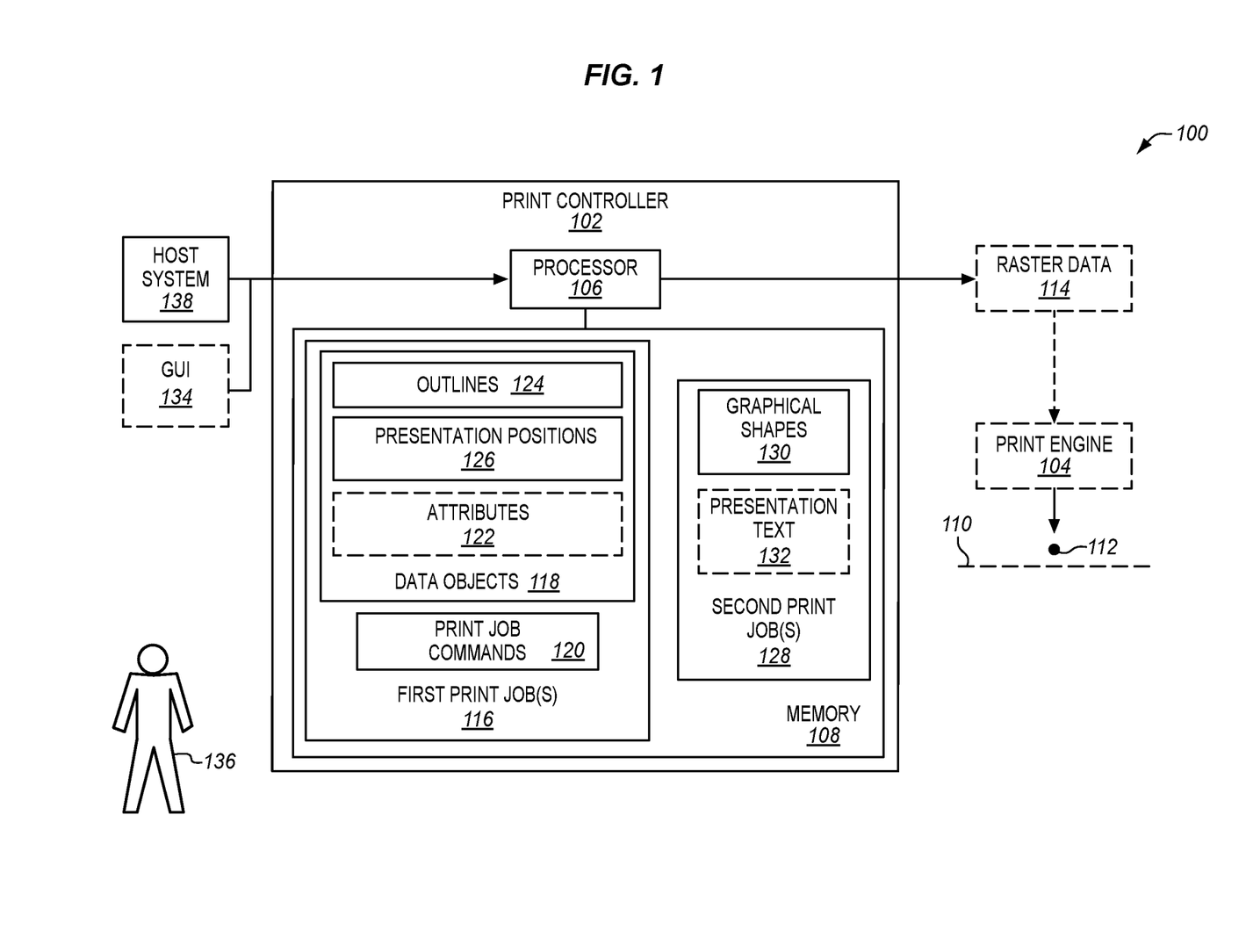
FIG. 1 is a block diagram of a printing system in an illustrative embodiment.

FIG. 1 is a block diagram of a printing system 100 in an illustrative embodiment. Printing system 100 is used in a printing environment, and includes a print controller 102 that controls functions or operations performed in a printing process. Print controller 102 may be included within printing system 100, or may operate outside of printing system 100 as a separate element. Printing system 100 may further include one or more print engine(s) 104. Print controller 102 may be implemented within print engine 104 in some embodiments.

Print controller 102 may comprise any electronic circuits and/or optical circuits that are able to perform the functions described herein for print controller 102. Print controller 102 may include one or more processors (e.g., a processor 106), Central Processing Units (CPU), Graphics Processing Units (GPU), microprocessors, Digital Signal Processors (DSPs), Application-specific Integrated Circuits (ASICs), Programmable Logic Devices, control circuitry, etc. Some examples of processors include INTEL® CORE™ processors, Advanced Reduced Instruction Set Computing (RISC) Machines (ARM®) processors, etc.

Print controller 102 may further comprise any electronic circuits, and/or optical circuits, and/or magnetic circuits that are able to store data. For instance, print controller 102 may include one or more memories (e.g., a memory 108), volatile or non-volatile Dynamic Random-Access Memory (DRAM) devices, FLASH devices, volatile or non-volatile Static RAM (SRAM) devices, magnetic disk drives, Solid State Disks (SSDs), etc. Some examples of non-volatile DRAM and SRAM include battery-backed DRAM and battery-backed SRAM.

In one embodiment, print engine 104 comprises any system, component, or device that marks a medium 110 with one or more colorant(s) 112 based on raster data 114. In another embodiment, print engine 104 comprises any system, component, or device that performs a 3-Dimensional printing process, using any suitable material as desired.

Colorant 112 may comprise toner, liquid inks, wax, or any material suitable to mark medium 110. Medium 110 may be continuous form or cut sheet, as desired. Medium 110 may comprise paper, textile, plastic, or any tangible substrate suitable for marking with colorant 112. Print engine 104 may comprise one or more marking engines as a matter of design. For example, print engine 104 may comprise at least one marking engine disposed on each side of medium 110. During the printing process, print controller 102 may transmit or provide raster data 114. Print engine 104 may receive raster data 114, and generate a printed output onto medium 110 based on raster data 114.

In a print shop environment, print controller 102 may receive first print job(s) 116 (e.g., from a host system 138) for processing by printing system 100. In some cases, first print jobs 116 may include errors which, when rasterized by processor 106 and printed by print engine 104, results in a printed output that is incorrect and/or causes performance issues at print controller 102.

Although errors in first print jobs 116 may be uncommon, errors nevertheless may arise for a number of reasons. For instance, a customer may generate first print job 116 at host system 138 having images in a first data format, and accidentally specify in first print job 116 that the images are in a second data format. In this example, when processor 106 generates raster data 114 with the image format error in first print job 116, the image data may be interpreted incorrectly by processor 106 due to the error in first print job 116, resulting in a printed output that is incorrect. In some cases, errors in first print job 116 may be difficult to diagnose. For instance, first print jobs 116 may include thousands of printable features that are spatially related to each other, partially overlay each other, have transparency aspects with respect to each other, etc., which would be structural information in first print jobs 116 that is typically invisible in a printed output of first print jobs 116.

In prior systems, a print shop employee may attempt to determine the root cause of the errors by modifying various logical structures, a configuration at a printer, and/or print data objects in first print jobs 116 in an attempt to isolate the cause of the problems. However, this is a time-consuming process that is an inefficient use of the resources at the print shop.

In the embodiments described herein, data objects 118 in first print jobs 116 are converted into printable features that, once printed or rendered into a displayable format on an electronic display, reveal information about first print jobs 116 that are often invisible in the printed or rendered output. For instance, data objects 118 for first print jobs 116 may be converted into graphical outlines and/or attribute information about data objects 118, which when printed, allows for a visual inspection of various features for data objects 118, such as their type, size, rotation, transparency, resource identifiers, etc. Data objects 118 in first print jobs 116 may comprise print data, which includes data from first print job 116 that is printed by print engine 104 when generating a printed output of first print job 116 (e.g., images, text, graphics, bar codes, etc.). Data objects 118 may also comprise logical data, which include non-print data from first print job 116 that is not printed by print engine 104 when generating a printed output of first print job 116 (e.g., logical pages, overlays, page segments, etc.).

First print jobs 116 further include print job commands 120, which comprise any type of data structure that defines data objects 118 for first print jobs 116. Print job commands 120 and/or data objects 118 may further define attributes 122 for data objects 118. Some examples of attributes 122 include formatting information, rotation, size, transparency, background colors, resource ID's, type of data objects 118, information encoded by data objects 118, statistics on drawing orders, statistics on objects stored in object containers, etc. The information encoded for data objects 118 and represented by attributes 122 may include text data for data objects 118 (e.g., actual text data represented by data objects 118, portions of the text data represented by data objects, human readable information associated with bar codes, etc.).

Print job commands 120 and/or data objects 118 may further define outlines 124 and presentation positions 126 for data objects 118 in a presentation space of first print jobs 116. Outlines 124 represent the boundaries of data objects 118 in the presentation space of first print jobs 116 and presentation positions 126 define the locations of the data objects 118 in the presentation space of first print jobs 116. For example, if a logical page (e.g., a presentation space) includes two images, each image may have information that defines the size of the images and their position in the presentation space of the logical page.

Figure 2:
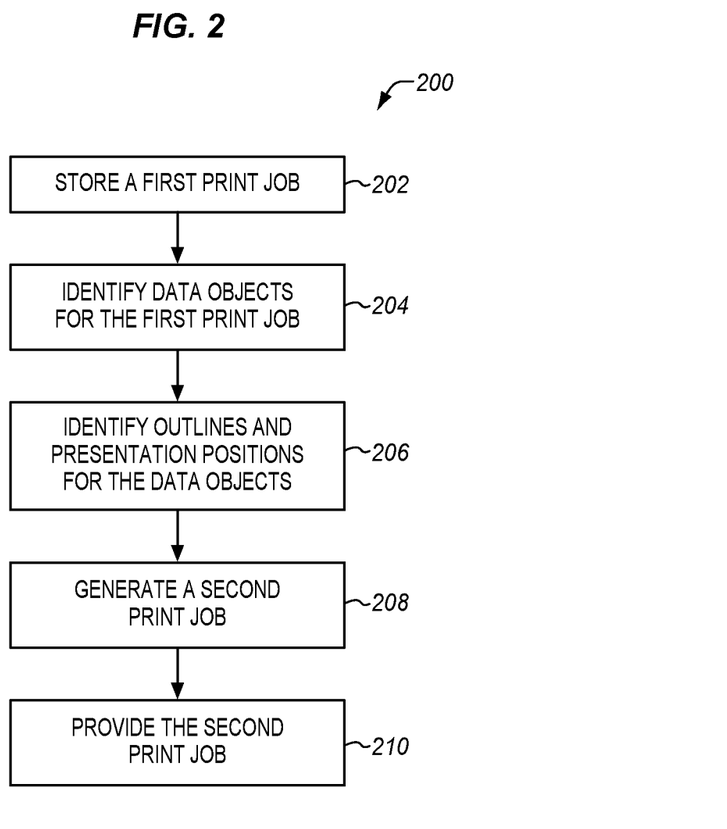
FIG. 2 is flow chart of a method of converting print jobs for analysis in an illustrative embodiment.
Figure 3:
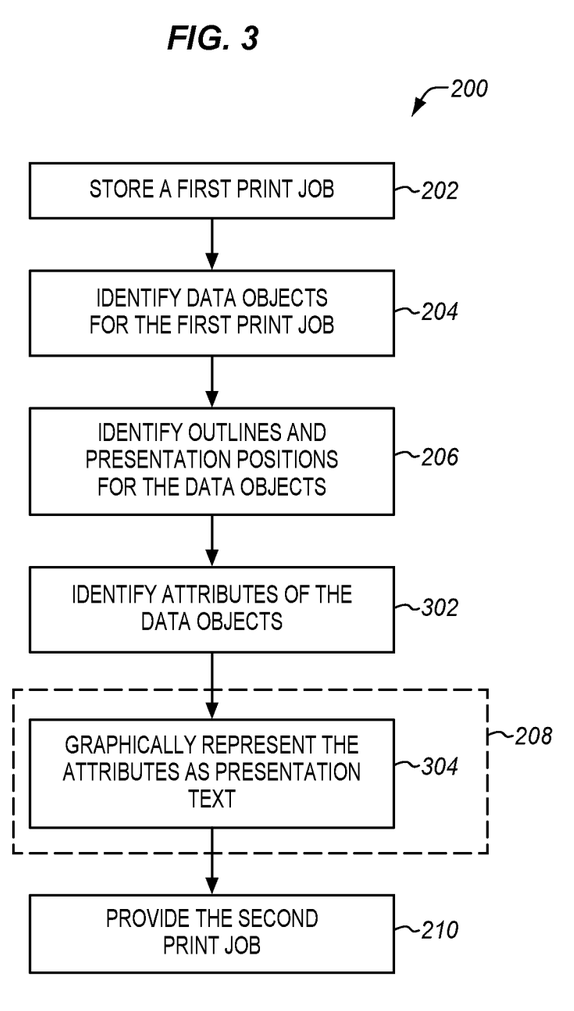
FIGS. 3-4 depict additional details of method 200 in illustrative embodiments.
Figure 4:
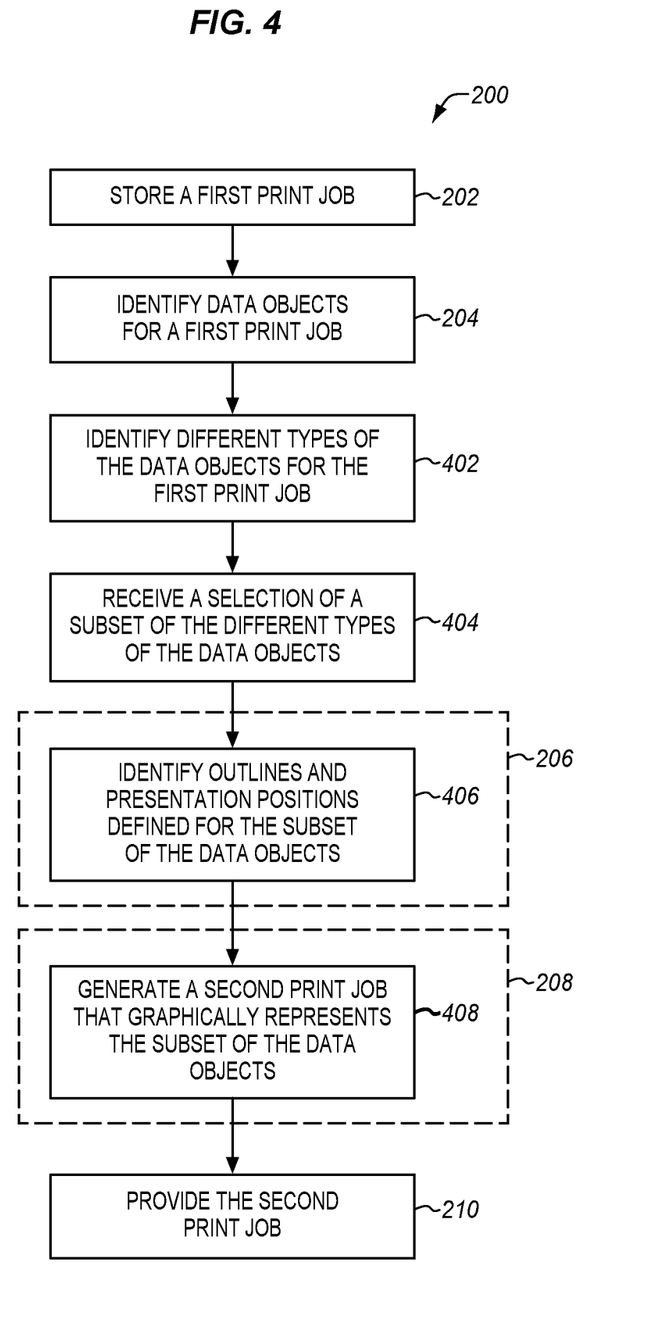
Figure 5:
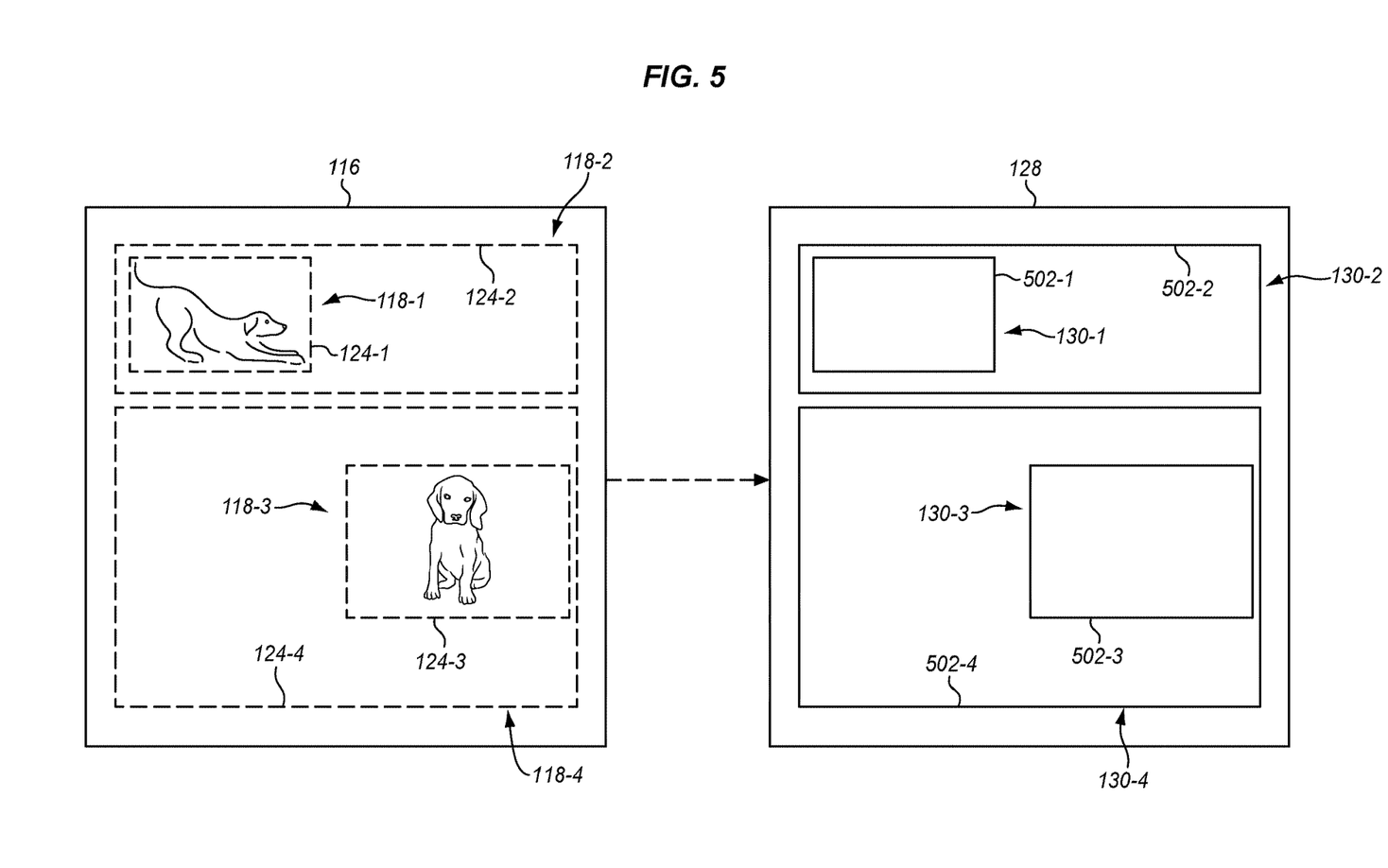
FIGS. 5-7 depict different logical structures in print jobs during the performance of the method of FIG. 2 in illustrative embodiments.

Consider that print controller 102 is operational and ready to begin processing first print jobs 116. FIG. 2 is a flow chart of a method 200 of converting print jobs for analysis in an illustrative embodiment. FIGS. 3-5 illustrates additional details of method 200 in illustrative embodiments.

Method 200 will be discussed with respect to printing system 100 in FIG. 1, although method 200 may be performed by other systems, not shown. The steps of the flow charts described herein may include other steps that are not shown. Also, the steps of the flow charts described herein may be performed in an alternate order.

Referring to FIG. 2, processor 106 receives first print job 116 (e.g., from host system 138), and stores first print job 116 in memory 108 (see step 202). First print job 116 may represent a job submitted by a customer for production printing. First print job 116 may utilize a Page Description Language (PDL) to describe data objects 118 for first print job 116. Some examples of a PDL include Portable Document Format (PDF), Intelligent Printer Data Stream (IPDS), POSTSCRIPT®, etc.

Processor 106 analyzes print job commands 120 to identify data objects 118 for first print job 116 (see step 204). For example, IPDS is a host-to-printer data stream for Advanced Function Presentation (AFP) architectures. IPDS provides an attachment-independent interface for controlling and managing AFP printers, allowing the presentation of pages containing an unlimited mixture of different data types, including text, images, graphics, bar codes, and object containers. IPDS allows different applications, which can be independent of each other, to create source data (e.g., graphics, images, bar codes, text). The IPDS architecture allows the output of these independent applications to be merged at print time, so that an integrated mixed-data page is the result.

An IPDS data stream includes data and controls defined through self-identifying structured fields, called IPDS commands, which describe the presentation of print data. Thus, in embodiments that utilize first print jobs 116 formatted in IPDS, processor 106, when identifying data objects 118 for first print job 116, may parse first print job 116 to identify the IPDS structured fields in first print job 116 that define the different types of data objects 118. Some examples of print job commands 120 in the IPDS format are described below.

One example of print job commands 120 that may be found within first print jobs 116 are located in a text command set. The text command set is composed of IPDS commands for presenting text information in a page, a page segment, or an overlay. The text command set includes, in part, a Write Text Control (WTC) command and a Write Text (WT) command. The WTC command defines the text presentation space, the text object area, and the mapping of the text presentation space into the text object area. The WT command is used to identify text for first print jobs 116 (i.e., a type of data object 118). The WT command is used to transmit up to 32K bytes of character data and controls to a printer. This data is part of a text object, page segment, or overlay, depending on the state of the printer. The WT command carries Presentation Text Object Content Architecture (PTOCA) data and PTOCA control sequences.

Another example of print job commands 120 that may be found within first print jobs 116 are located in an IM-Image command set. The IM-Image command set is composed of IPDS commands for presenting image raster data on a logical page, a page segment, or an overlay. The IM-Image command set includes, in part, a Write Image Control (WIC) command and a Write Image (WI) command. The WIC command defines the IM image object area on the current page, page segment, or overlay. The WI command transmits IM-Image data (i.e., a type of data object 118) to a printer as a sequence of scan lines.

Another example of print job commands 120 that may be found within first print jobs 116 are part of an IO-Image command set. The IO-Image command set is composed of IPDS commands for presenting Image Object Content Architecture (IOCA) image data in a page, a page segment, or an overlay. The IO-Image command set includes, in part, a Write Image Control 2 (WIC2) command and Write Image (WI2) command. The WIC2 command defines the image presentation space, the image object area, and the mapping of the image presentation space into the image object area. The WI2 command is used to identify IOCA image data (i.e., a type of data object 118) for first print jobs 116. The WI 2 command transmits IOCA image data and the parameters that define the image data to a printer.

Another example of print job commands 120 that may be found within first print jobs 116 are part of a graphics command set. The graphics command set is composed of IPDS commands and data controls for presenting graphical pictures on a page, a page segment, or an overlay. The graphic command set includes, in part, a Write Graphics Control (WGC) command and a Write Graphics (WG) command. The WGC command defines the graphics presentation space window, defines the graphics object area, maps the graphics presentation space window into the graphics object area, and establishes the initial conditions for interpreting the graphics data. The WG command transmits graphics data (i.e., a type of data object 118) to a printer. The data comprises graphics segments that include the drawing orders that define the picture in the graphics presentation space.

Another example of print job commands 120 that may be found within first print jobs 116 are part of a bar code command set. The bar code command set includes IPDS commands and controls for presenting bar-coded information on a page, a page segment, or an overlay. The bar code command set includes, in part, a Write Bar Code Control (WBCC) command a Write Bar Code (WBC) command. The WBCC command defines the bar code presentation space, defines the bar code object area, maps the bar code presentation space into the bar code object area, and establishes the initial conditions for printing the bar code data. The WBC command is used to identify bar codes (i.e., a type of data object 118) for first print jobs 116. The WBC command transmits Bar Code Object Content Architecture (BCOCA) symbol data for a bar code, including parameters that locate the bar code symbol origin within a bar code object area.

Another example of print job commands 120 that may be found within first print jobs 116 are part of an object container command set. The object container command set includes IPDS commands for downloading presentation object containers, and for downloading, managing, and including data object resources and data-object-font components. The object container command set includes, in part, a Write Object Container Control (WOCC) command and a Write Object Container (WOC) command. The WOCC command causes a printer to enter an object-container, page-object-container, or overlay-object-container state. For presentation objects, the parameters of the WOCC command define, position, and orient the object container object area, map the object container presentation space into the object container area, and establish the initial conditions for interpreting the object container data. The WOC command transmits object container data to a printer (e.g., which may be used to represent different types of data objects 118 stored in object containers). The type of data in the WOC command is specified in the WOCC command.

Another example of print job commands 120 that may be found within first print jobs 116 is a Logical Page Descriptor (LPD) command. The LPD command establishes the characteristics of the current logical page for a subsequent sent page or overlay. These characteristics include the units in which the logical page is specified, the units in which the offset of the logical page on the medium presentation space is specified, and the units in which the positioning of the object areas on the logical page is specified. The LPD that is current when a Begin Overlay (BO) command is received becomes part of the overlay. When this overlay is included on a logical page, the LPD values stored in the overlay redefine the current logical page for the extent of the overlay.

Another example of print job commands 120 that may be found within first print jobs 116 are part of an overlay command set. The overlay command set allows frequently accessed user data, in the form of an overlay resource, to be downloaded and temporarily stored at a printer. An overlay is defined within a logical page presentation space. The overlay command set includes IPDS commands the printer uses to download, deactivate, and present overlays. The overlay command set includes, in part, the Begin Overlay (BO) command and an Include Overlay (IO) command. The BO command causes a printer to leave a home state and enter an overlay state. The commands that follow the BO command define the data that the printer saves as an overlay resource. The IO command causes a previously activated overlay to be presented on the current logical page at the specified presentation position (i.e., an overlay is a type of data object 118). The most recently received LPD (described above) describes the size of the overlay.

Another example of print job commands 120 that may be found within first print jobs 116 are part of a page segment command set. The page segment command set allows frequently accessed user data, in the form of a page segment resource, to be downloaded to the printer. The page segment command set includes IPDS commands that the printer uses to download, deactivate, and present page segments. A page segment, like an overlay, includes the same type of presentation commands used in a page. The page segment command set includes, in part, a Begin Page Segment (BPS) command and an Include Page Segment (IPS) command. The BPS command causes a printer to leave the home state and enter the page segment state. The command sequence that follows defines data that the printer saves as a page segment resource. The IPS command causes a previously stored page segment resource to be processed in the input data stream as though its commands had just been received from the host. When the printer includes a page segment, the current position is inherited by the page segment and can be changed by text control sequences within the page segment. Page segments are a type of data object 118. Page segments don't have a size defined in IPDS, so page segments may not have outline 124. However, page segments may have attributes 122, which can be represented as presentation text 132 in second print jobs 128.

Another example of print job commands 120 that may be found within first print jobs 116 is a Begin Page (BP) command. The BP command causes the printer to enter the page state. This command identifies the beginning of a logical page in first print jobs 116. Logical pages are a type of data object 118.

Another example of print job commands 120 that may be found within first print jobs 116 is an End Page (EP) command. The EP command causes the printer to exit the page state. This command identifies the end of a logical page in first print jobs 116. The most recently received LPD command (described above) describes the size of the logical page.

Referring again to FIG. 2, processor 106 identifies outlines 124 and presentation positions 126 specified for data objects 118 (see step 206). Processor 106 may, for example, analyze print job commands 120, and/or data objects 118 in first print job 116 in order to determine outlines 124 and presentation positions 126. If first print job 116 is formatted in IPDS, processor 106 may analyze any of the previously described command sets and or data objects 118 defined by those command sets, in order to determine outlines 124 and/or presentation positions 126. If, for instance, a bar code type of data object 118 is being analyzed in first print job 116, a bar code object area defined in the WBCC command may be used to identify outlines 124 and/or presentation position 126 for the bar code in a presentation space.

In response to identifying outlines 124 and presentation positions 126 for data objects 118 in first print job 116, processor 106 generates a second print job 128 that graphically represents outlines 124 and presentation positions 126 of data objects 118 as graphical shapes 130 (see step 208). Graphical shapes 130 may be implemented in second print job 128 in a number of different ways. For example, graphical shapes 130 may comprise image objects, text objects, graphical objects, etc., that are generated to represent outlines 124 and presentation positions 126 in a presentation space of second print job 128. In response to generating second print job 128, processor 106 provides second print job 128 (see step 210). In one embodiment, processor 106 provides second print job 128 to a destination that renders second print job 128 for display on an electronic display. In another embodiment, processor 106 rasterizes second print job 128 to generate raster data 114, which may be received by print engine 104. Print engine 104 may then generate a printed output of second print job 128 by marking medium 110 with colorant 112. In another embodiment, processor 106 directs a Graphical User Interface (GUI) 134 to visually display a rendering of second print job 128. GUI 134 comprises any component, system, or device that displays information to print operator 136, and allows print operator 136 to interact with printing system 100. GUI 134 may comprise displays, pointing devices, keyboards, mice, touch screens, or any combination thereof that allows print operator 136 and printing system 100 to interact with each other.

FIG. 5 is a visual representation of first print job 116 and second print job 128 in an illustrative embodiment. FIG. 5 depicts first print job 116 with data objects 118, and further displays second print job 128 with graphical shapes 130 that represent outlines 124 and presentation positions 126 for data objects 118. In the embodiment depicted in FIG. 5, data object 118-1 and data object 118-3 in first print job 116 comprise images, having outline 124-1 and outline 124-3, respectively, and data object 118-2 and data object 118-4 in first print job 116 comprise overlays, having outline 124-2 and outline 124-4, respectively.

Further in this embodiment, second print job 128 visually represents the result of performing method 200, with graphical shape 130-1 having a boundary 502-1 formed as graphical lines that correspond to outline 124-1 of data object 118-1, graphical shape 130-2 having a boundary 502-2 formed as graphical lines that correspond to outline 124-2 of data object 118-2, graphical shape 130-3 having a boundary 502-3 formed as graphical lines that correspond to outline 124-3 of data object 118-3, and graphical shape 130-4 having a boundary 502-4 formed as graphical lines that correspond to outline 124-4 of data object 118-4. Generally, graphical shapes 130 represent outlines 124 of data objects 118 in first print job 116, and also represent their presentation positions relative to each other. For instance, boundary 502-1 of graphical shape 130-1 and boundary 502-2 of graphical shape 130-2 in second print job 128 have a size and a relative position with respect to each other that corresponds to outline 124-1 of data object 118-1 and outline 124-2 of data object 118-2 in a presentation space of first print job 116.

In some embodiments, processor 106, when generating second print job 128, may include additional information about data objects 118 that is visible when second print job 128 is printed or displayed. This type of additional information may be helpful when analyzing first print job 116.

Referring to FIG. 3, processor 106 identifies attributes 122 of data objects 118 (see step 302), and graphically represents attributes 122 in second print job 128 as presentation text 132 (see step 304). Attributes 122 may include any type of information about data objects 118. Some examples of attributes 122 include a type of data object 118 (e.g., text, images, graphics, bar codes, logical pages, overlays, page segments, etc.), a format of data objects 118 (e.g., Joint Photographic Experts Group (JPEG), Tag Image File Format (TIFF), etc.). Some additional examples of attributes 122 include a resource identifier of data objects 118 (OID's used to identify data objects 118), human readable text for bar codes, and/or a color space of data objects 118 (e.g., CIELAB, RGB, sRGB, etc.).

Figure 6:
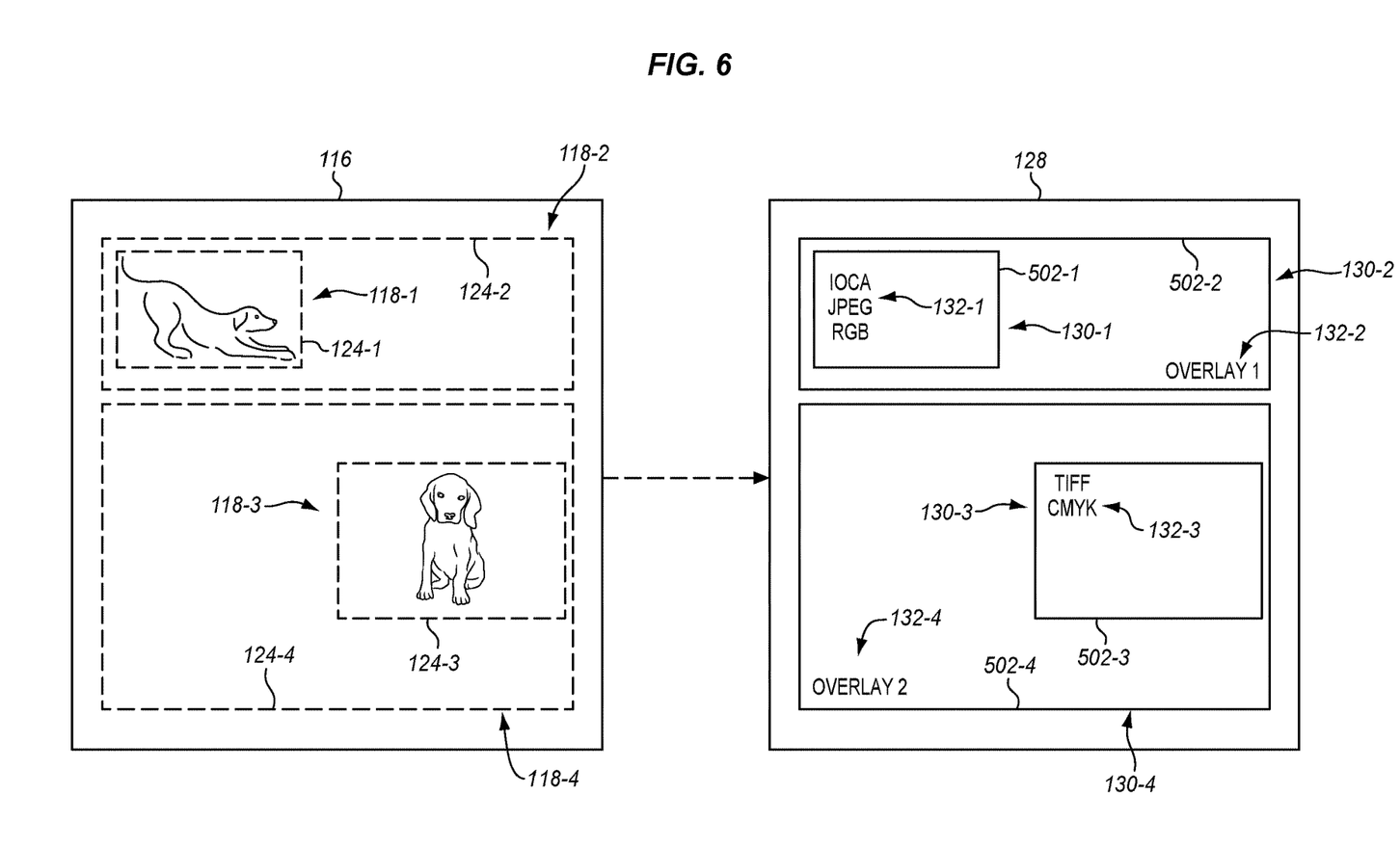

FIG. 6 is a visual representation of first print job 116 and second print job 128 in another illustrative embodiment. FIG. 6 depicts first print job 116 with data objects 118 as previously described with respect to FIG. 5, and second print job 128 with graphical shapes 130 as previously described with respect to FIG. 5. However, in this embodiment, second print job 128 includes presentation text 132 that represents attributes 122 for data objects 118. In this embodiment, presentation text 132-1 includes information about data object 118-1, which is an image, presentation text 132-2 includes information about data object 118-2, which is an overlay, presentation text 132-3 includes information about data object 118-3, which is an image and presentation text 132-4 includes information about data object 118-4, which is an overlay. The use of presentation text 132 in second print job 128 provides additional information regarding data objects 118 that may be used during the analysis of first print job 116. Presentation text 132 may be positioned anywhere relative to its corresponding graphical shape 130 in a presentation space, but in one embodiment, presentation text 132 is graphically represented within boundaries 502 of graphical shapes 130 (e.g., presentation text 132-1 is located within boundary 502-1 of graphical shapes 130-1).

As discussed briefly above, first print job 116 and/or second print job 128 may comprise IPDS jobs in some embodiments. In these embodiments, data objects 118 in first print job 116 may comprise one or more of print data objects (e.g., as defined by WT, WBC, WI, WI2. and/or WOC commands), overlays (e.g., as defined by IO commands in first print job 116), logical pages (e.g., as defined by BP or end page (EP) commands in first print job 116), page segments (e.g., as defined by IPS commands in first print job 116), and object containers (e.g., as defined by WOC commands in first print job 116). In these embodiments, second print job 128 may implement graphical shapes 130 and/or presentation text 132 using any type of presentation data objects in the IPDS format as desired. In one particular embodiment, graphical shapes 130 may be implemented using the text command set, by converting outlines 124, presentation position 126, and/or attributes 122 for data objects 118 in first print job 116 into text objects in second print job 128 and/or text-major text (e.g., WT commands not in a text object). In IPDS, text objects include the ability to define a background color, which may be used to represent outlines 124 of data objects 118 in second print job 128 (e.g., boundaries 502 and the interior area within boundaries 502 of graphical shapes 130 may be represented using background colors). Text-major text implementations may use one or more draw rules to form graphical shapes 130, which may be used to represent outlines 124 of data objects 118 in second print job 128 (e.g., boundaries 502 of graphical shapes 130 are formed from draw rule text orders). Further, IPDS text objects and text-major text include the ability to display presentation text 132, which may be used to display attributes 122 for data objects 118.

Although it may be desirable in most cases to generate second print job 128 based on data objects 118 in first print job 116, in some cases it may be desirable to select some data objects 118 for representation in second print job 128 and not others. This case is depicted in the flow chart of FIG. 4. To do so, processor 106 identifies different types of data objects 118 in first print job 116 (see step 402). As discussed above, any number of different types of data objects 118 may be part of first print job 116, including print data objects, logical pages, overlays, page segments, containers, etc. In response to processor 106 analyzing first print job 116 to determine the different types of data objects 118 for first print job 116, processor 106 may receive a selection of a subset of the different types of data objects 118 for first print job 116 (see step 404). In one embodiment, processor 106 may display the different types of data objects 118 to print operator 136 utilizing GUI 134, thereby allowing print operator 136 to select the subset of data objects 118 for first print job 116 that will be represented in second print job 128 as graphical shapes 130. In another embodiment, processor 106 may select the subset of data objects 118 for first print job 116 based on an algorithm, a rule, and/or information in first print job 116.

Figure 7:
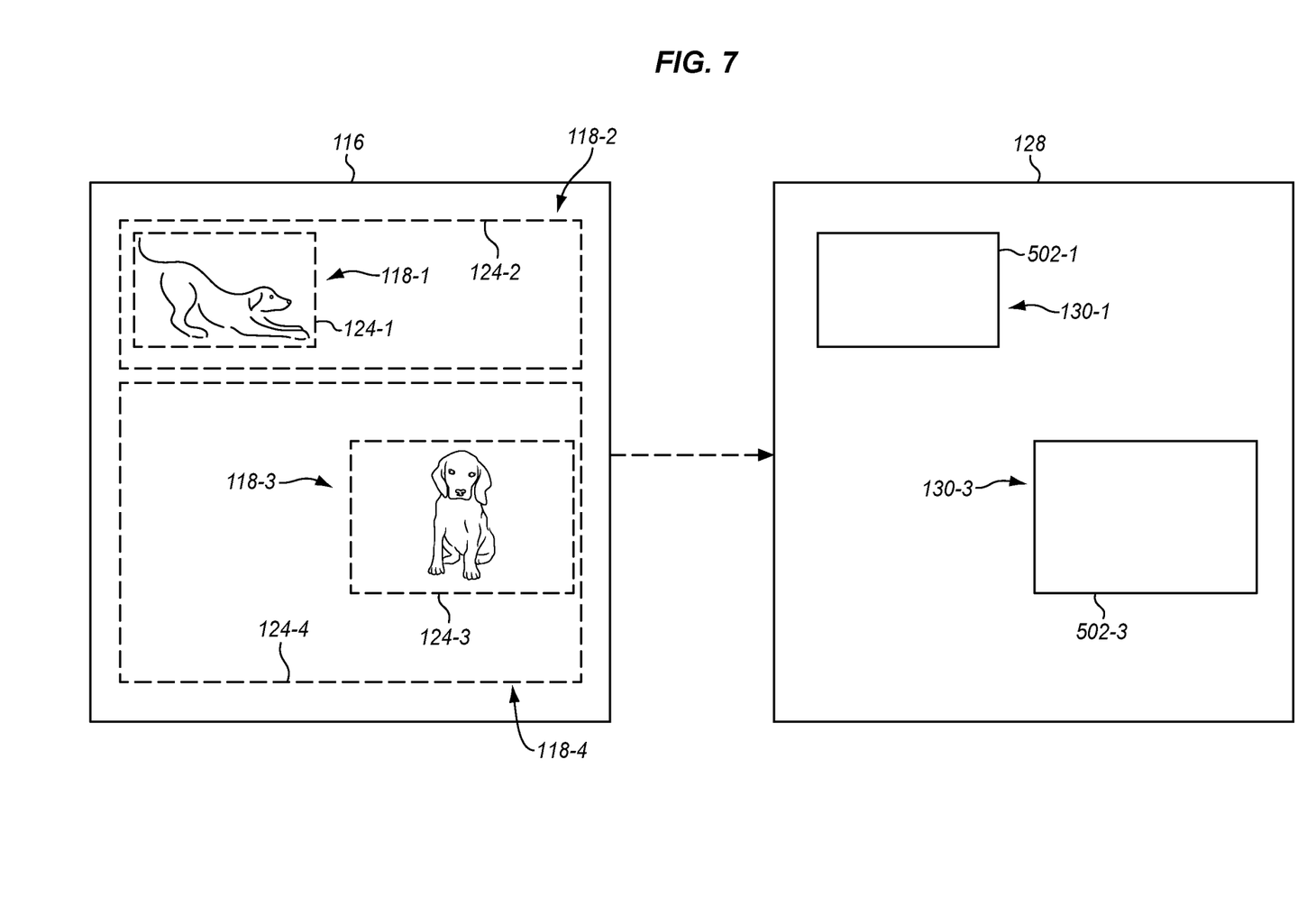

In response to receiving the selection, processor 106 identifies outlines 124 and presentation positions 126 specified for the subset of data objects 118 selected (see step 406), which may be similar to step 206, previously described. Processor 106 may then generate second print job 128 to graphically represents outlines 124 and presentation positions 126 for the subset of data objects 118 as graphical shapes 130 (see step 408), which may be similar to step 208, previously described. One example of this type of process is depicted in FIG. 7, which is a visual representation of first print job 116 and second print job 128 in another illustrative embodiment. In this embodiment, data objects 118 that comprise images (e.g., data object 118-1 and data object 118-3) are selected in the process depicted in FIG. 4 and data objects 118 that comprise overlays are not selected (e.g., data object 118-2 and data object 118-4) in the process depicted in FIG. 4, resulting in the hybrid view depicted in FIG. 7. FIG. 7 illustrates that second print job 128 includes graphical shapes 130 representing data objects 118 that are images in first print job 116 (e.g., graphical shape 130-1 and graphical shape 130-3), but does not include graphical shapes 130 that represent data objects 118 in first print job 116 that are overlays (e.g., graphical shape 130-2 and graphical shape 130-4 are missing, as compared to FIG. 5).

Using the various embodiments described herein, data objects 118 in first print jobs 116 are converted into graphical shapes 130 that expose the underlying information in first print jobs 116, which allows for a visual inspection of the logical structures and relationships between the logical data and the print data in first print job 116. Because the conversion exposes the underlying information present in first print job 116, which is often invisible in a normal printed output of first print job 116, a technical benefit is achieved that allows for a visual inspection of the logical structures, print data object information, and a spatial relationship between the logical structures and print data object information that may be used during analysis in order to identify possible errors in first print job 116.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as programmed instructions executable by a processor or a computer to perform the functions of the element. Some examples of programmed instructions are software, program code, and firmware. The programmed instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Figure 8:
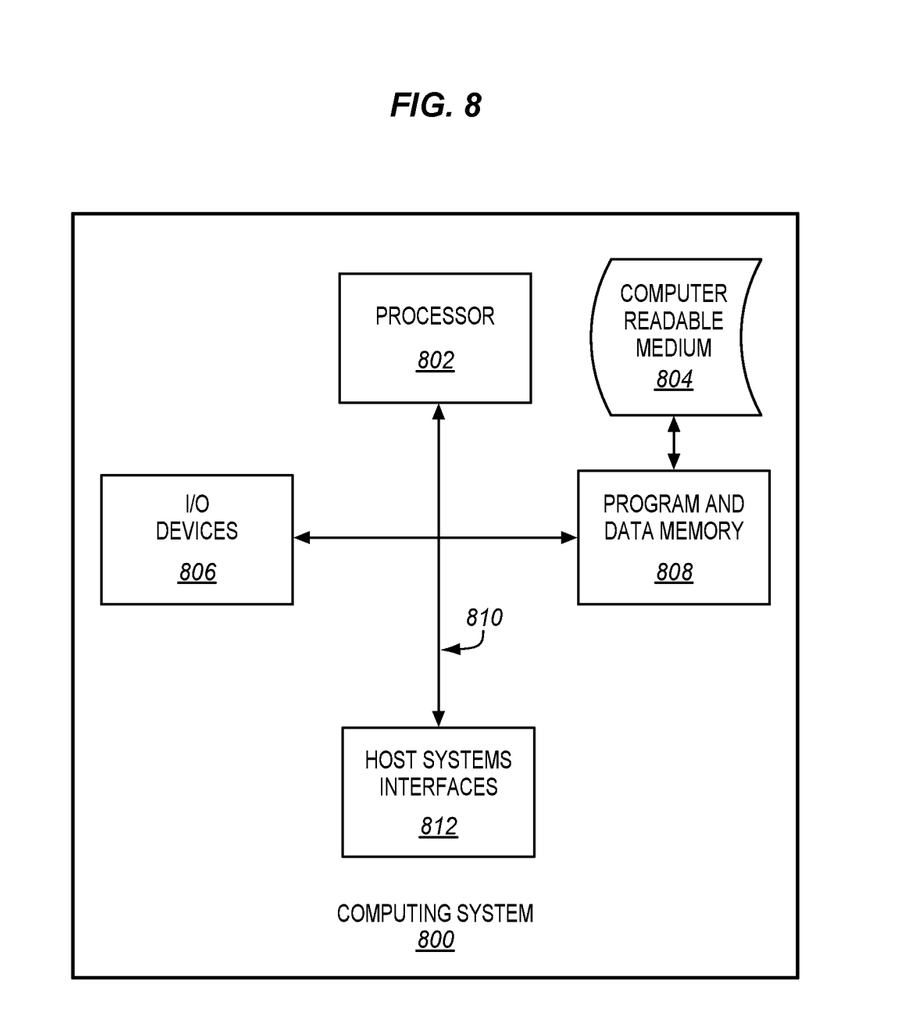
FIG. 8 illustrates a computing system in which a computer readable medium may provide instructions for performing any of the functionality disclosed herein.

In one embodiment, the invention is implemented in software, which includes but is not limited to firmware, resident software, microcode, etc. FIG. 8 illustrates a computing system 800 in which a computer readable medium 804 may provide instructions for performing any of the functionality disclosed herein.

Furthermore, the invention can take the form of a computer program product accessible from computer readable medium 804 that provides program code for use by or in connection with a processor or any instruction execution system. For the purposes of this description, computer readable medium 804 can be any apparatus that can tangibly store the program for use by or in connection with the instruction execution system, apparatus, or device, including computing system 800.

Computer readable medium 804 can be any tangible electronic, magnetic, optical, electromagnetic, infrared, or semiconductor system (or apparatus or device). Examples of computer readable medium 804 include a semiconductor or solid-state memory, magnetic tape, a removable computer diskette, a random-access memory (RAM), a read-only memory (ROM), a rigid magnetic disk and an optical disk. Some examples of optical disks include compact disk-read only memory (CD-ROM), compact disk-read/write (CD-R/W) and DVD.

Computing system 800, suitable for storing and/or executing program code, can include one or more processors 802 coupled directly or indirectly to memory 808 through a system bus 810. Memory 808 may include local memory employed during actual execution of the program code, bulk storage, and cache memories which provide temporary storage of at least some program code in order to reduce the number of times code is retrieved from bulk storage during execution. Input/output (IO) devices 806 (including but not limited to keyboards, displays, pointing devices, etc.) can be coupled to the system either directly or through intervening IO controllers. Network adapters may also be coupled to the system to enable computing system 800 to become coupled to other data processing systems, such as through host systems interfaces 812, or remote printers or storage devices through intervening private or public networks. Modems, cable modem and Ethernet cards are just a few of the currently available types of network adapters.

Although specific embodiments were described herein, the scope is not limited to those specific embodiments. Rather, the scope is defined by the following claims and any equivalents thereof

What is claimed is:

1. A printing system, comprising:
a print controller comprising:
    a memory configured to store a first print job comprising one or more data objects, and print job commands that define the data objects for the first print job; and
    at least one processor configured to process the print job commands to identify the data objects for the first print job, and to identify outlines and presentation positions specified for the data objects in the first print job,
    the at least one processor is configured to identify a plurality of attributes for each of the data objects in the first print job, wherein the attributes comprise a type of the data objects, a resource identifier of the data objects, and a format of the data objects,
    the at least one processor is configured to generate a second print job that graphically represents the outlines and the presentation positions of the data objects as graphical shapes and that graphically represents, for each of the data objects, the attributes of a corresponding data object as presentation text within a boundary of a graphical shape for the corresponding data object, and to provide the second print job.

2. The printing system of claim 1, wherein:
an interior area within the boundary of the graphical shape for the corresponding data object is represented using a background color.

3. The printing system of claim 1, wherein the attributes further comprise:
a color space of the data objects.

4. The printing system of claim 1, wherein:
the first print job and the second print job comprise Intelligent Printer Data Stream (IPDS) print jobs,
the data objects in the first print job comprise at least one of print data objects, logical pages, overlays, and object containers, and
the second print job includes at least one of text objects and text-major text that define the graphical shapes.

5. The printing system of claim 4, wherein:
the text objects define the graphical shapes using background colors, and
the text-major text defines the graphical shapes using one or more draw rules.

6. The printing system of claim 1, wherein:
the at least one processor is configured to identify different types of the data objects in the first print job, to receive a selection of a subset of the different types of the data objects, to identify the outlines and the presentation positions specified for the subset of the different types of the data objects, and to generate the second print job to graphically represent the outlines and the presentation positions of the subset of the different types of the data objects as the graphical shapes.

7. The printing system of claim 1, wherein:
the at least one processor is configured to rasterize the second print job to generate raster data, and to provide the raster data, and
the printing system further comprises:
at least one print engine configured to receive the raster data, and to mark at least one colorant onto a medium based on the raster data to generate a printed output of the second print job.

8. A method, comprising:
storing a first print job comprising one or more data objects, and print job commands that define the data objects for the first print job;
processing the print job commands to identify the data objects for the first print job;
identifying outlines and presentation positions specified for the data objects in the first print job;
identifying a plurality of attributes for each of the data objects in the first print job, wherein the attributes comprise a type of the data objects, a resource identifier of the data objects, and a format of the data objects;
generating a second print job that graphically represents the outlines and the presentation positions of the data objects as graphical shapes and that graphically represents, for each of the data objects, the attributes of a corresponding data object as presentation text within a boundary of a graphical shape for the corresponding data object; and
providing the second print job.

9. The method of claim 8, wherein:
an interior area within the boundary of the graphical shape for the corresponding data object is represented using a background color.

10. The method of claim 8, wherein the attributes further comprise:
a color space of the data objects.

11. The method of claim 8, wherein:
the first print job and the second print job comprise Intelligent Printer Data Stream (IPDS) print jobs,
the data objects in the first print job comprise at least one of print data objects, logical pages, overlays, and object containers, and
the second print job includes at least one of text objects and text-major text that define the graphical shapes.

12. The method of claim 11, wherein:
the text objects define the graphical shapes using background colors, and
the text-major text defines the graphical shapes using one or more draw rules.

13. The method of claim 8, wherein:
the method further comprises:
identifying different types of the data objects in the first print job; and
receiving a selection of a subset of the different types of the data objects; and
identifying the outlines and the presentation positions further comprises:
identifying the outlines and the presentation positions specified for the subset of the different types of the data objects; and
generating the second print job further comprises:
generating the second print job to graphically represent the outlines and the presentation positions of the subset of the different types of the data objects as the graphical shapes.

14. A non-transitory computer-readable medium embodying programmed instructions which, when executed by at least one processor of a print controller, directs the at least one processor to:
store a first print job comprising one or more data objects, and print job commands that define the data objects for the first print job;
process the print job commands to identify the data objects for the first print job;
identify outlines and presentation positions specified for the data objects in the first print job;
identify a plurality of attributes for each of the data objects in the first print job, wherein the attributes comprise a type of the data objects, a resource identifier of the data objects, and a format of the data objects;
generate a second print job that graphically represents the outlines and the presentation positions of the data objects as graphical shapes and that graphically represents, for each of the data objects, the attributes of a corresponding data object as presentation text within a boundary of a graphical shape for the corresponding data object; and
provide the second print job.

15. The non-transitory computer-readable medium of claim 14, wherein:
an interior area within the boundary of the graphical shape for the corresponding data object is represented using a background color.

16. The non-transitory computer-readable medium of claim 14, wherein the attributes further comprise:
a color space of the data objects.

17. The non-transitory computer-readable medium of claim 14, wherein the programmed instructions further direct the at least one processor to:
direct a Graphical User Interface (GUI) to visually display a rendering of the second print job.

18. The non-transitory computer-readable medium of claim 14, wherein:
the first print job and the second print job comprise Intelligent Printer Data Stream (IPDS) print jobs,
the data objects in the first print job comprise at least one of print data objects, logical pages, overlays, and object containers, and
the second print job includes at least one of text objects and text-major text that define the graphical shapes.

19. The non-transitory computer-readable medium of claim 18, wherein:
the text objects define the graphical shapes using background colors, and
the text-major text defines the graphical shapes using one or more draw rules.

20. The non-transitory computer-readable medium of claim 14, wherein the programmed instructions further direct the at least one processor to:
identify different types of the data objects in the first print job;
receive a selection of a subset of the different types of the data objects;
identify the outlines and the presentation positions specified for the subset of the different types of the data objects; and
generate the second print job to graphically represent the outlines and the presentation positions of the subset of the different types of the data objects as the graphical shapes.

* * * * *